United States Patent
De Carvalho Costa et al.

(10) Patent No.: US 11,137,743 B2
(45) Date of Patent: Oct. 5, 2021

(54) SYSTEM AND METHOD FOR TRACING A PRODUCT ITEM

(71) Applicant: SICPA HOLDING SA, Prilly (CH)

(72) Inventors: Diego De Carvalho Costa, Rio de Janeiro (BR); Nilton Marchetto, Jaguariúna-SP (BR)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 16/469,120

(22) PCT Filed: Nov. 8, 2017

(86) PCT No.: PCT/EP2017/078599
§ 371 (c)(1),
(2) Date: Jun. 12, 2019

(87) PCT Pub. No.: WO2018/108392
PCT Pub. Date: Jun. 21, 2018

(65) Prior Publication Data
US 2020/0019146 A1    Jan. 16, 2020

(30) Foreign Application Priority Data

Dec. 12, 2016  (WO) .................. PCT/EP2016/080609

(51) Int. Cl.
*G05B 19/418* (2006.01)

(52) U.S. Cl.
CPC .............. *G05B 19/4183* (2013.01); *G05B 2219/31296* (2013.01); *G05B 2219/31432* (2013.01)

(58) Field of Classification Search
CPC ...... G05B 19/4183; G05B 2219/31296; G05B 2219/31432; G05B 2219/32212;
(Continued)

(56) References Cited

U.S. PATENT DOCUMENTS 5,555,504 A * 9/1996 Lepper ............... G05B 19/4183
  700/115
6,522,939 B1   2/2003 Strauch et al.
(Continued)

FOREIGN PATENT DOCUMENTS

EP    0686900    12/1995
EP    0686901    12/1995

OTHER PUBLICATIONS

Dictionary.com defining the term "camera". (Year: NA) (Year: 2020).*
(Continued)

*Primary Examiner* — Hien D Khuu
(74) *Attorney, Agent, or Firm* — Muncy, Geissler, Olds & Lowe, P.C.

(57) ABSTRACT

The present application concerns a system for tracing a product item (102, 104) on a production line (100) comprising a control unit (10) and a timestamp counter (11), wherein the control unit (10) is configured to receive a product signal related to the product item (102, 104) from at least one peripheral device (12, 14, 16, 18, 20, 22, 24, 26). According to the invention, the control unit (10) is further configured to carry out the method steps of receiving a plurality of product signals each relating to a product item (102, 104) and a peripheral device (12, 14, 16, 18, 20, 22, 24, 26), generating a plurality of event signals, wherein each event signal is based on one of the product signals, arranging the event signals in a sequence corresponding to an order in which the product signals were received, and associating a timestamp generated by the timestamp counter (11) with the sequence.

7 Claims, 2 Drawing Sheets

(58) Field of Classification Search
CPC .... G05B 2219/36371; G05B 19/41875; Y02P 90/22; Y02P 90/10
USPC ........................................................ 700/115
See application file for complete search history.

(56) References Cited

U.S. PATENT DOCUMENTS

| | | | | |
|---|---|---|---|---|
| 6,843,415 | B2* | 1/2005 | Vogler | G06Q 20/203 |
| | | | | 235/385 |
| 7,380,213 | B2* | 5/2008 | Pokorny | B23Q 35/12 |
| | | | | 715/764 |
| 10,685,191 | B2 | 6/2020 | Hattrup et al. | |
| 2005/0246048 | A1* | 11/2005 | Fetahovic | A24C 5/00 |
| | | | | 700/115 |
| 2017/0210098 | A1* | 7/2017 | Moore | E04B 1/665 |

OTHER PUBLICATIONS

Dictionary.com defining the term "scanner". (Year: NA) (Year: 2020).*
Sau L. Lee et al: "Modernizing Pharmaceutical Manufacturing: from Batch to Continuous Production", Journal of Pharmaceutical Innovation, vol. 10, No. 3, Mar. 19, 2015 (Mar. 19, 2015), pp. 191-199, XP055566830, Boston; ISSN:1872-5120, DOI:10.1007/s12247-015-9215-8.
International Search Report and Written Opinion dated Mar. 7, 2018 with respect to application No. PCT/EP2017/078599, 11 pages.
International Preliminary Report on Patentability dated Mar. 25, 2019 with respect to application No. PCT/EP2017/078599, 33 pages.
Eurasian Office Action in counterpart Eurasian Application No. 201991179 dated Mar. 26, 2021 (and English language translation of the Office Action).

* cited by examiner

SYSTEM AND METHOD FOR TRACING A PRODUCT ITEM

TECHNICAL FIELD

The present invention relates to a system for tracing a product item on a production line comprising a control unit and a timestamp counter, wherein the control unit is configured to receive a product signal related to the product item from at least one peripheral device. The invention further relates to a method of tracing a product item on a product line.

BACKGROUND

Systems for tracing a product item on a production line are generally known in the art. Common systems use peripheral devices such as cameras or sensors to measure a physical property of a product item on a production line or printers to apply a mark on the product item or handling devices e.g. to move the product item along the production line. Some of the peripheral devices recognize malfunctions of the production line such as inappropriate or missing product items on the production line. However, in common systems it is quite difficult for the personnel working on the production line to trace a particular product item and thus to determine a reason for a possible malfunction or inappropriate production result.

For tracing purposes, it is generally known from the prior art to provide peripheral devices which include one or more timestamp counters to be generally capable of associating a particular timestamp to a product item when the product item is handled by the respective peripheral device. However, the known systems still fail to provide a reliable tracing mechanism because the timestamp counters of the respective peripheral devices are usually not synchronized so that the order of handling steps applied to a particular product item can be inaccurate or even misleading. This particularly happens if the timestamp counters are initialized with different count values or have different increment rates, which makes the interpretation of a trace related to a particular product item difficult or even impossible. Synchronizing all timestamp counters is relatively difficult and thus expensive because sophisticated devices are needed to synchronize the timestamp counters of each peripheral device.

SUMMARY

The present invention aims at solving the problem of inaccurate tracing of a product item on a product line as is experienced in usual tracing systems for production items on a production line. In other words, the present invention aims at providing a system and a method for accurately tracing a product item on a production line at low efforts and costs.

A solution to this problem is given by the system of claim 1 and the method of claim 7. Advantageous features and aspects of the invention are subject to the dependent claims, the description and the drawings.

A system for tracing a product item on a production line according to the present invention comprises a control unit and a timestamp counter. A control unit is configured to receive a product signal related to the product item from at least one peripheral device. Further, the control unit is configured to carry out the method steps of receiving a plurality of product signals each relating to a product item and a peripheral device, generating a plurality of event signals, wherein each event signal is based on one of the product signals, arranging the event signals in a sequence corresponding to an order in which the product signals were received, and associating a timestamp generated by the timestamp counter with a sequence.

Here it is to be noted that the control unit can comprise the timestamp counter as an integral part of the control unit, or the timestamp counter can be provided as a separate element of the claimed system. The expression "control unit" is functionally defined which means that the control unit is not required to be a single physical piece or an assembly of members which are located close to each other or within a common housing. Rather, the control unit can comprise different systems or elements which are in communication with each other but not necessarily physically close to each other. Parts of the control unit can also be virtual, i.e. the result of a computer program executed on an appropriate device. For example, the control unit can be formed by a stationary programmable logic controller (PLC) device and an application run on a mobile device such as a laptop PC, a tablet PC or a smartphone. The sum of the PLC and the mobile device can be considered as a "control unit" in terms of the present invention.

The product signals are preferably real-time signals. A real time signal is a signal which is received by the control unit in a close timely relationship to the event triggering the signal. The event triggering sending of a real time signal is its generation or the completion thereof. This is in contrast to signals which are collected and sent following a fixed schedule independent of the time when the generation of the signal has been completed.

The event signals respectively correspond to an event experienced by a particular product item. For example, an event signal can be "to_print", "to_read", "read", "not_read", "to_eject" or "to_aggregate". Similarly, event signals can be "not_read with ink" or "not_read without ink". An event signal is based on a particular product signal and additional information with respect to e.g. the peripheral device from which the product signal has been received.

For example, if one of the peripheral devices is a print head, the product signal issued by the print head and received by the control unit can preferably be that the print head has just been operated. In this case, the event signal is set "to_read" explaining that the product item is now ready to be read. Further examples of event signals and their relationship to other elements of the system may become apparent from the description of the drawings.

Preferably the at least one peripheral device is at least one of the group of a camera, a printer, a proximity sensor, a movement sensor, a laser sensor, a weight sensor, a fluid lever sensor, a product item recognition device, a filler counter, a brand identification system, a labelling static counter or a labelling mobile counter. This is a particularly preferred selection of peripheral devices which can be used in connection with a production line and assist in the production process along the production line. The sensors and the camera are devices which issue a signal to the control unit to provide information on the production item. The printer is an example for a peripheral device which allows for marking the product item which, however, also allows for deriving information on the state of the product item when the printer confirms to the control unit that a printing operation has been completed.

In a preferred embodiment, the control unit is a programmable logic device which is programmed to carry out the method steps of receiving the plurality of product signals, generating the plurality of event signals, arranging the event signals in the sequence and associating the timestamp with the sequence. Of course, it is possible that the programmable logic device is split up into more than one device and it is also possible that only some of the method steps are carried out by a correspondingly programmed programmable logic device whilst others of the method steps are carried out by other devices such as non-programmable integrated circuits, a virtual application on a mobile device or similar devices.

According to a preferred embodiment, the event signals are stored in sequence in a first-in-first-out (FIFO) data structure. The FIFO data structure is advantageous because it facilitates assigning information from any of the peripheral devices to a particular product item since the FIFO data structure defines a sequence in which the event signals are stored which corresponds to the sequence of events on which the product signals and thus the event signals are based. In addition, the FIFO data structure is an efficient way of determining those event signals which can be deleted after having been used by the system. In a FIFO data structure, the oldest non-used event signals are replaced, and thus deleted, by the newest event signals.

Further preferably, the system comprises at least one sensor to recognize a product item for the timestamp counter to generate the timestamp for the sequence of the product item. Such a sensor can be a specific example of a peripheral device which facilitates handling the information obtained by other peripheral devices with respect to a particular product item because the sensor can identify the presence of a particular product item thus initiating the generation of the timestamp for the sequence of the particular product item. Following the order of handling the product items, a particular timestamp can always be determined for a particular product item.

Preferably, the system further comprises the at least one peripheral device. In other words, the at least one peripheral device is preferably part of the system rather than interacting with the system.

According to a method of the present invention, a product item is traced on a production line by comprising the steps of receiving a plurality of product signals each relating to one of the plurality of product items and one of at least one peripheral device, generating a timestamp, generating a plurality of event signals, wherein each event signal is based on one of the product signals, arranging the event signals in a sequence corresponding to an order in which the product signals were received, and associating the timestamp with the sequence. This method can preferably be carried out by using a system as defined above.

Preferably, generating the timestamp for the sequence of the product item is triggered by at least one sensor recognizing the product item. As explained above, such a sensor can be an example of a peripheral device as mentioned above, but can generally also be an integral part of the control unit or, in case of the method not being carried out on the system as described above, a completely separate element.

The above described system and method allow for easily and precisely tracing a product item on a production line, even if the peripheral devices of the production line are not synchronized so that it is not necessary for the system and method to work that the peripheral devices are synchronized. This reduces costs and effort to be spent on the overall production line, in particular the peripheral devices. A particular reason for achieving this result is that event signals are used instead of product signals, arranged in a sequence corresponding to an order in which the product signals were received which, in particular in case of real-time processing and sending of the signals by the peripheral devices to the control unit, exactly depicts a relative position of a product item in the production line, and only a single timestamp is used and associated with a sequence of events experienced by the particular product item so as to precisely determine a particular product item and identify any malfunction or irregularity on the production line.

Further details of the invention may become apparent from the following description of preferred embodiments and the claims appended thereto.

DESCRIPTION OF PREFERRED EMBODIMENTS

Figure 1:
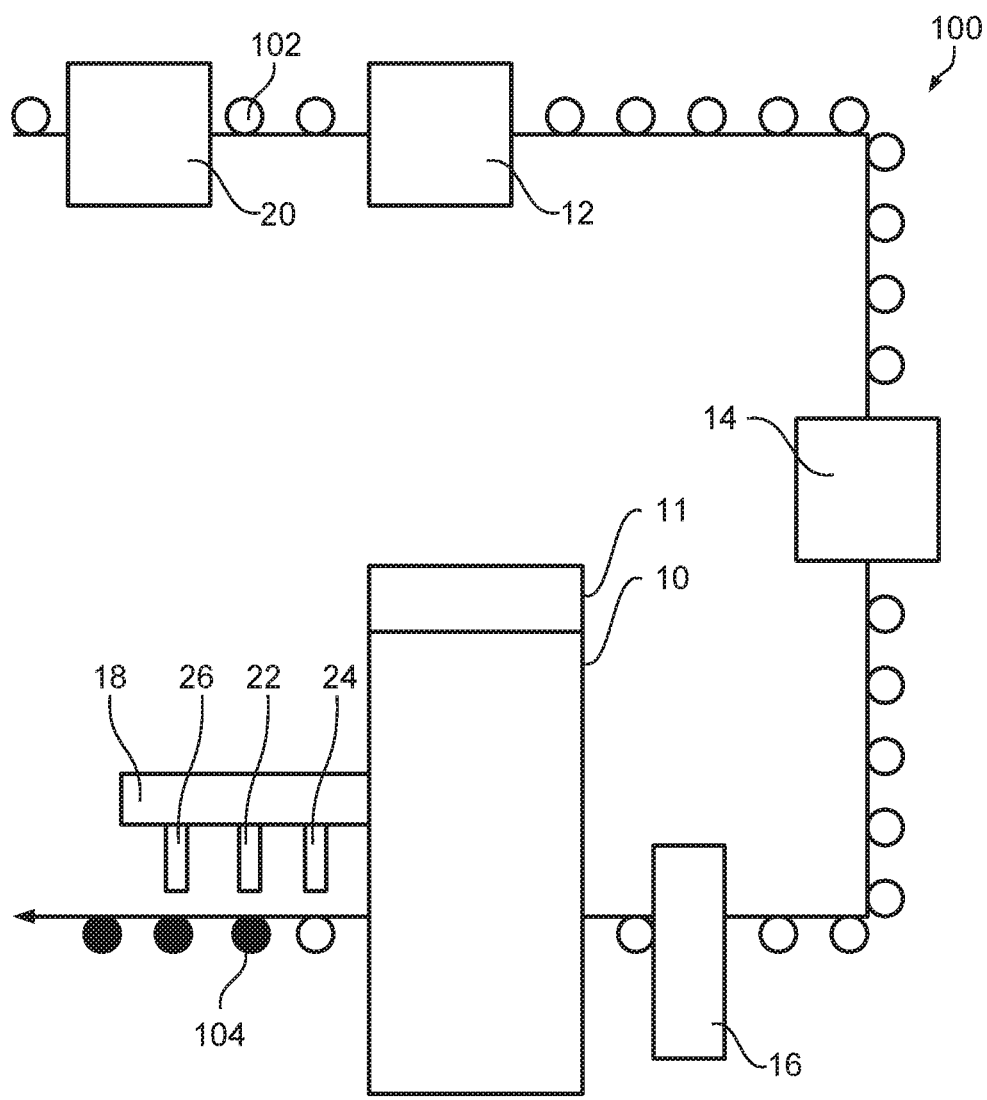
FIG. 1 is a schematic diagram showing an embodiment of a system for tracing a product item on a production line comprising peripheral devices.

FIG. 1 illustrates a production line 100 comprising a control unit 10 and a timestamp counter 11. In this embodiment, the control unit 10 is a programmable logic controller (PLC) which is configured to receive a product signal related to a product item 102, 104 from peripheral devices 12, 14, 16, 18, 20, 22, 24, 26. The peripheral devices in the embodiment illustrated in FIG. 1 are a filler counter 12, a brand identification system 14, a labelling static counter 16 and a beam 18 equipped with a print head 22, a mobile counting sensor 24 and a quality camera 26.

The control unit 10 at least partially manages or at least partially controls all devices of the production line. It particularly sends trigger signals to printer(s) and camera(s).

A counting sensor 20 initially recognizes the presence of a particular product item 102 on the production line and sends information on the recognition of the product item 102 to the control unit 10 which stores this information preferably in a FIFO data structure.

The filler counter 12 comprises three counting sensors and a height detection sensor which is responsible for detecting products and measuring the height for an automatic adjustment of a height of the beam 18 described further below.

The brand identification system 14 comprises two sensors and two vision color cameras which take a picture of each product and send the picture to the control unit.

The labelling static counter 16 comprises three counting sensors the results of which also being sent to the control unit 10.

Finally, the beam 18 is provided with the print head 22, the mobile counting sensor 24 and the quality camera 26. By means of the print head 22 of the beam 18, a digital stamp is printed on each product item reflecting the product and the timestamp generated by the timestamp counter 11 and associated with the sequence of the particular product.

The control unit 10 may additionally comprise a Java app which organizes the production line data, sends a code to be printed on the product by the print head 22 to the print head 22, receives data from one of the vision systems such as the brand identification system 14, the quality camera 26 or the further parts of the control unit 10, e.g. a programmable logic controller.

By means of the above described and illustrated system for tracing a product item 102, 104, it is possible to clearly assign a particular timestamp to a particular product item so as to allow for a reliably tracing a particular product item, in particular in case of a malfunction of the production line.

Figure 2:
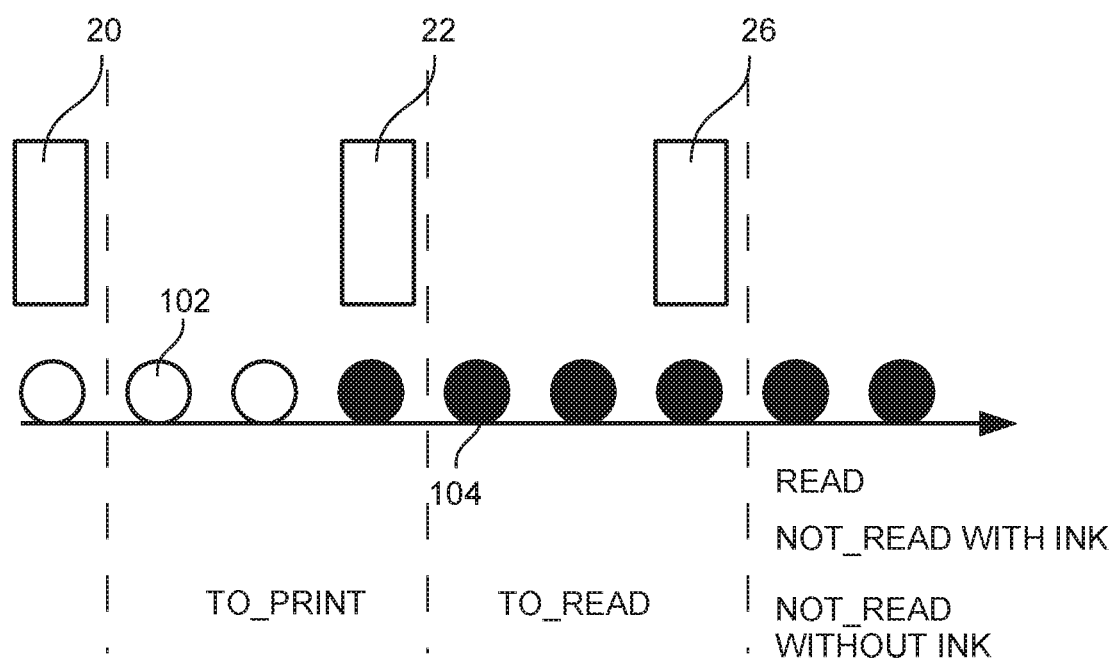
FIG. 2 is an illustration of a trace of a particular product item along with a first-in-first-out state.

FIG. 2 illustrates how to trace a product item 102, 104 using the first-in-first-out state (FIFO state). The counting sensor 20 recognizes the presence of a product item 102 at an empty FIFO state. When recognizing the presence of the product item 102, the sensor 20 issues a signal of recognition of the product item 102 which is received by the control unit 10 which then generates, based on the signal issued by the sensor 20, an event signal, namely "to_print" and stores this event signal in the FIFO data structure.

This step is repeated for every product item recognized by the counting sensor 20. Accordingly, the FIFO data structure reveals how many product items are on their way from the sensor 20 to the print head 22 so as to be printed. On their way to the print head 22, the brand identification system 14 and labelling static counter 16 illustrated in FIG. 1 recognize additional information with respect the respective product item which information is received by the control unit 10 and stored in the order of recognition in the FIFO structure so that the information can be clearly assigned to a particular product item in the FIFO data structure. This way it is clear which product item 102 is handled by the respective device so that the corresponding information can be clearly assigned to the particular product item.

When the product item 102 reaches the print head 22, the print head 22 prints a particular mark on the product item 102. The mark can e.g. comprise the information obtained from the other peripheral devices with respect to the particular product item as well as a timestamp generated by a timestamp counter, e.g. when the counting sensor 20 initially recognizes the presence of the product item 102.

After the print head 22 completed the printing step, it issues a product signal to the control unit 10 which is then transformed into an event signal. The marked product item 104 is thus assigned a different FIFO state, namely, "to_read" and is transported towards the quality camera 26 where the mark applied by the print head 22 is to be read.

Depending on the success of the printing step carried out by the print head 22 and the reading step carried out by the quality camera 26, the quality camera 26 issues the signal whether it was able to_read the mark, was unable to_read the mark but recognized ink or was unable to_read the mark and was also unable to recognize ink. Depending on the outcome of the quality camera measurement, the FIFO state assigned to the particular product item is changed by the control unit 10 to "read", "not_read with ink" or "not_read without ink" so that it is possible for the user of the system to trace a malfunction of the production line.

Using the above described embodiment of a system of tracing a product item, it is no longer necessary to synchronize the different peripheral devices, but it is possible to reliably trace a particular product item in order to determine and identify a malfunction or irregularity of the production line.

The invention claimed is:

1. A system for tracing a particular product item on a production line comprising a control unit and a timestamp counter, which are comprised on the production line, wherein the control unit is configured to receive a real-time product signal related to the particular product item from peripheral devices of the production line, wherein the control unit is further configured to carry out a method comprising: receiving a plurality of real-time product signals, each of the plurality of real-time product signals relating to the particular product item and a peripheral device of the peripheral devices, generating a plurality of event signals, wherein each event signal of the plurality of event signals is based on one of the plurality of real-time product signals and corresponds to an event experienced by the particular product item, arranging the plurality of event signals in a sequence corresponding to an order in which the plurality of real-time product signals was received in order to determine a relative position of the particular product item in the production line, and associating a timestamp generated by the timestamp counter with the sequence, wherein the peripheral devices comprise: a counting sensor configured to initially recognize the particular product item on the production line to produce the real-time product signal, the control unit being configured to receive the real-time product signal from the counting sensor to trigger the timestamp counter to generate the timestamp for the sequence of the particular product item such that the timestamp counter generates the timestamp when the counting sensor initially recognizes the presence of the particular product item on the production line, a print head configured to print a digital stamp on the particular product item, the digital stamp reflecting the information with respect to the particular product item obtained from at least one of the peripheral devices, which precedes the print head on the production line, and the timestamp associated with the sequence of the particular product item, and a quality camera which is succeeding to the print head on the production line and is configured to read the digital stamp printed on the particular product item and to issue an event signal whether it is possible to read the digital stamp or not.

2. The system of claim 1, wherein at least one of the peripheral devices is a camera, a printer, a proximity sensor, a movement sensor, a laser sensor, a weight sensor, a fluid level sensor, a production item recognition device, a filler counter, a brand identification system, a labelling static counter or a labelling mobile counter.

3. The system of claim 1, wherein the control unit is a programmable logic device which is programmed to carry out the method.

4. The system of claim 1, wherein the plurality of event signals is stored in the sequence in a FIFO data structure.

5. A method of tracing a particular product item on a production line, comprising: receiving, by a control unit comprised on the production line and configured to receive a real-time product signal related to the particular product item from peripheral devices of the production line, a plurality of real-time product signals each relating to the particular product item and a peripheral device of the peripheral devices, the peripheral devices comprising a counting sensor, a print head and a quality camera, generating a timestamp by a timestamp counter comprised on the production line, generating, by the control unit, a plurality of event signals, wherein each event signal of the plurality of event signals is based on one of the plurality of real-time product signals and corresponds to an event experienced by the particular product item, arranging, by the control unit, the plurality of event signals in a sequence corresponding to an order in which the plurality of real-time product signals was received in order to determine a relative position of the particular product item in the production line, associating, by the control unit, the timestamp with the sequence, and printing by the print head a digital stamp on the particular product item, the digital stamp reflecting the information with respect to the particular product item obtained from at least one of the peripheral devices, which precedes the print head on the production line, and the timestamp associated with the sequence of the particular product item, wherein generating the timestamp for the sequence of the particular product item is triggered by the real-time product signal produced by the counting sensor initially recognizing the particular product item on the production line and received by the control unit such that the timestamp counter generates the timestamp when the counting sensor initially recognizes the presence of the particular product item on the production line, wherein the method further comprises reading by the quality camera the digital stamp printed on the particular product item, and issuing by the quality camera an event signal whether it is possible to read the digital stamp or not, wherein the quality camera is succeeding to the print head on the production line.

6. The method of claim 5, wherein at least one of the peripheral devices is a camera, a printer, a proximity sensor, movement sensor, a laser sensor, a weight sensor, a fluid level sensor, a production item recognition device, a filler counter, a brand identification system, a labelling static counter or a mobile counter.

7. The method of claim 5, wherein the plurality of event signals is stored in the sequence in a FIFO data structure.

* * * * *